United States Patent
Köster et al.

(10) Patent No.: US 9,724,723 B2
(45) Date of Patent: *Aug. 8, 2017

(54) DEVICE FOR APPLYING A FOAMING REACTION MIXTURE

(71) Applicant: Covestro Deutschland AG, Leverkusen (DE)

(72) Inventors: Ralf Köster, Leverkusen (DE); Horst-Uwe Jung, Köln (DE); Catherine Lövenich, Bergisch Gladbach (DE)

(73) Assignee: Covestro Deutschland AG, Leverkusen (DE)

( * ) Notice: Subject to any disclaimer, the term of this patent is extended or adjusted under 35 U.S.C. 154(b) by 31 days.

This patent is subject to a terminal disclaimer.

(21) Appl. No.: 14/372,039

(22) PCT Filed: Jan. 15, 2013

(86) PCT No.: PCT/EP2013/050675
§ 371 (c)(1),
(2) Date: Jul. 14, 2014

(87) PCT Pub. No.: WO2013/107742
PCT Pub. Date: Jul. 25, 2013

(65) Prior Publication Data
US 2014/0342089 A1    Nov. 20, 2014

(30) Foreign Application Priority Data
Jan. 16, 2012    (EP) ..................................... 12151254

(51) Int. Cl.
*B05C 5/02*    (2006.01)
*B29C 44/46*    (2006.01)
(Continued)

(52) U.S. Cl.
CPC ............ *B05C 5/027* (2013.01); *B05B 7/0056* (2013.01); *B05C 5/025* (2013.01); *B05D 1/34* (2013.01); *B05D 7/14* (2013.01); *B29C 44/461* (2013.01)

(58) Field of Classification Search
CPC ............................. B29C 44/461; B05B 7/0056
See application file for complete search history.

(56) References Cited

U.S. PATENT DOCUMENTS 2,098,523 A    11/1937    Simning et al.
4,201,150 A *   5/1980    Edwards ............... B05B 13/041
                                                              118/314
(Continued)

FOREIGN PATENT DOCUMENTS

DE    2038253 A1    2/1972
DE    19741523 A1    4/1998
(Continued)

OTHER PUBLICATIONS

International Search Report for PCT/EP2013/050675 mailed Apr. 11, 2013.

*Primary Examiner* — Michael P Rodriguez
(74) *Attorney, Agent, or Firm* — K&L Gates LLP

(57) ABSTRACT

The invention relates to a device (100) for applying a foaming reaction mixture (600) onto a top layer (500), in particular for producing a composite element, comprising at least one casting rake (200, 260) with a tubular hollow body (210), said hollow body (210) extending along a central axis (250) and having at least two outlet openings (220) for discharging the foaming reaction mixture (600). The casting rake (200, 260) and the top layer (500) can be moved relative to each other along a longitudinal axis (510). According to the invention, the central axis (250) of the at least one casting rake (200, 260) and the longitudinal axis (510) of the (Continued)

movement form an angle (400, 410) of <=80 DEG relative to each other.

11 Claims, 3 Drawing Sheets

(51) Int. Cl.
  *B05B 7/00* (2006.01)
  *B05D 1/34* (2006.01)
  *B05D 7/14* (2006.01)

(56) References Cited

U.S. PATENT DOCUMENTS

| | | | |
|---|---|---|---|
| 4,945,854 A | | 8/1990 | Nicola et al. |
| 5,411,389 A | * | 5/1995 | Kellerhof ................ B29C 39/16 264/45.9 |
| 2010/0080900 A1 | * | 4/2010 | Geraedts ............... B29C 44/461 427/240 |
| 2011/0003082 A1 | * | 1/2011 | Schoen ................. B29C 31/042 427/420 |
| 2014/0017412 A1 | | 1/2014 | Schoen et al. |

FOREIGN PATENT DOCUMENTS

| | | |
|---|---|---|
| DE | 202009015838 U1 | 3/2010 |
| DE | 202011001109 U1 | 4/2011 |
| GB | 2317848 A | 4/1998 |
| WO | WO-2008/018787 A1 | 2/2008 |
| WO | WO-2009/077490 A1 | 6/2009 |
| WO | WO 2009077490 A2 * | 6/2009 ........... B29C 31/042 |

* cited by examiner

DEVICE FOR APPLYING A FOAMING REACTION MIXTURE

CROSS-REFERENCE TO RELATED APPLICATIONS

This application is a national stage application (under 35 U.S.C. §371) of PCT/EP2013/050675, filed Jan. 15, 2013, which claims benefit of European Application No. 12151254.5, filed Jan. 16, 2012, both of which are incorporated herein by reference in their entirety.

The present invention relates to an apparatus for applying a foaming reaction mixture to a covering layer. In addition, the present invention relates to a process for producing composite elements containing PUR/PIR foam.

PRIOR ART

Composite elements made up of a covering layer and an insulating core are nowadays used in many fields of industry. The basic structure of such composite elements consists of a covering layer to which an insulating material is applied. As covering layers, it is possible to use, for example, sheets of coated steel, stainless steel, aluminum, copper or alloys of the latter two materials. However, polymer sheets or films, aluminum foils, glass fiber nonwovens or mineral fiber nonwovens and also cellulose-containing materials such as paper, paperboard or paper mache can also be used as covering layer materials. The choice of the suitable covering layer material depends on the intended use of the composite elements and the materials requirements resulting therefrom. Foams based on polyurethane (PUR) and/or on polyisocyanurate (PIR), in particular, can be used as insulating core.

Apart from the use of such composite elements for the insulation of, for example, coolstores, these elements are evermore frequently employed as facing elements on buildings or as elements of industrial doors or, for example, for forming sectional doors. Such composite elements, hereinafter also referred to as sandwich elements, display, due to their covering layer, a stability and surface configuration corresponding to the material used, while the applied foam makes appropriate thermal insulation properties possible.

To produce such composite elements, a foaming reaction mixture is applied by means of an application apparatus to a prepared covering layer. For this purpose, for example when using foams based on isocyanates, the appropriate polyol components and isocyanate components are mixed with one another and applied to the covering layer on which they foam and cure.

Tubular hollow bodies which are provided along their longitudinal extension with a plurality of outlet openings from which the reaction mixture introduced into the tube can exit are frequently used as application apparatus for applying the foaming reaction mixture to the covering layer. Such tubes are usually referred to as casting rakes.

To achieve very uniform distribution of the foaming reaction mixture on the covering layer, the distribution of the outlet openings configured as exit tubes along the longitudinal extension of the casting rake is appropriately optimized. To achieve an optimized distribution of the foaming reaction mixture along the longitudinal extension of the covering layer, too, the casting rake can be moved in an oscillating fashion over the covering layer or, as an alternative, the casting rake is arranged in a fixed manner and the covering layer is moved under the casting rake. This can be carried out either continuously or batchwise.

Thus, for example, WO 2009/077490 A1 discloses a process for producing composite elements consisting of at least one covering layer and a rigid foam based on isocyanate, in which the covering layer is moved continuously and the starting material for the rigid foam based on isocyanate is applied to the covering layer, with the application of the liquid starting material for the rigid foam based on isocyanate occurring by means of at least one fixed tube which is arranged parallel to the plane of the covering layer and at right angles to the direction of motion of the covering layer and is provided with openings.

WO 2008/018787 A1 discloses an apparatus for applying a viscous mixture to a surface by means of one or more outlet openings, where the viscous mixture is fed by means of a tubular feed device to the apparatus.

The German utility model DE 20 2011 001 109 U1 discloses an apparatus for applying liquid reaction mixtures to a covering layer, where the covering layer is moved continuously and the liquid reaction mixture is applied to the covering layer, which apparatus consists of at least one tube which is provided with openings in the direction of the covering layer and which is arranged above the covering layer parallel to the plane of the covering layer and at right angles to the direction of motion of the covering layer, with the exterior openings on the side of the tube located above the edge of the covering layer being installed at an angle of from 1° to 50° in the direction of the edge of the covering layer.

The German utility model DE 20 2009 015 838 U1 discloses an apparatus for applying liquid reaction mixtures to a covering layer, where the covering layer is moved continuously and the liquid reaction mixture is applied to the covering layer and the apparatus is at least one tube provided with openings and the tube consists of plastic.

The known types of casting rakes can lead to the disadvantage that, depending on the shape and movement of the covering layer relative to the casting rake, uniform distribution of the reaction mixture is not advantageously possible. In particular, uniform distribution of the reaction mixture is not ensured in the side regions of the covering layer itself or at fastening elements present on the covering layer, for example in the side regions of the fastening elements.

DISCLOSURE OF THE INVENTION

It is therefore an object of the present invention to provide an improved apparatus for producing composite elements made up of a covering layer and a foam layer applied thereto, which apparatus allows, in particular, improved application of a foaming reaction mixture forming the foam.

This object is achieved by an apparatus for applying a foaming reaction mixture to a covering layer, which comprises at least one casting rake having a tubular hollow body which extends along a central axis and has at least two outlet openings for exit of the foaming reaction mixture, and where the casting rake and the covering layer can be moved relative to one another along a longitudinal axis and it is provided according to the invention that the central axis of the at least one casting rake and the longitudinal axis of motion enclose an angle of ≤80° relative to one another.

It has surprisingly been found that even composite elements having a complicated geometry can be produced in a better way using an arrangement of the casting rake at an angle of ≤80°. For example, it is possible in the case of a covered fastening of the composite element, as are provided, for example, in the case of facing elements, to ensure improved distribution of the foam on the covering layer in the side regions. A further advantage occurs in the production of composite elements having creases which, in particular, form a corrugated profile, as are used, for example, in the case of roof profiles. Here, the angular arrangement of the casting rake leads to optimal application of the foaming reaction mixture in the creases.

For the purposes of the invention, the term "tubular" refers to any suitable hollow profile shape in which the reaction mixture can be conveyed to the outlet openings. In particular, hollow profiles having a round, elliptical or angular profile cross section and also conical hollow profiles are encompassed.

Basically, the covering layer is moved along under the at least one casting rake, for example continuously as continuous strip of material, in order to apply a foaming reaction mixture. However, the indicated relative motion between the casting rake and the covering layer can, for the purposes of the present invention, also be produced when the at least one casting rake is moved along over a stationary covering layer or when both the casting rake and the covering layer are moved.

The tubular hollow body does not have to run along a straight central axis and can, in order to achieve the same effect according to the invention of improved application of the foaming reaction mixture forming the foam, be provided with a curvature. The angle can, for example, be defined on chords which run through the ends of the casting rakes.

In an embodiment of the apparatus of the invention, this has at least two casting rakes which are arranged at the same absolute angles relative to the axis of motion of the covering layer. For the purposes of the invention, same absolute angles means that the absolute value of the angle at which the casting rakes are aligned relative to the axis of the direction of motion between the covering layer and the casting rake is essentially identical; it can be provided that the two casting rakes are arranged in a V-shape relative to one another. In particular, it can be provided that the vector of the direction of motion halves the angle between the two casting rakes. In this way, uniform distribution of the reaction mixture over the entire surface of the covering layer is advantageously also possible in the case of relatively large profile widths.

In a further embodiment of the apparatus of the invention, it can be provided that the absolute value of the angle at which the casting rakes are aligned relative to the direction of motion of the covering layer is different, so that the two casting rakes are arranged relative to one another in the form of an unsymmetrical V. This makes it possible, for example, in the case of a covered fastening of the composite element, as is provided, for example, in the case of facing elements, to ensure improved distribution of the foam on the covering layer in the side regions and to introduce more material into the nose of the profile. A further advantage is obtained in the production of composite elements having creases (wave profile), as are used, for example, as roof profiles. Here, the arrangement of the casting rakes so as to form a V-shaped arrow leads to optimized application of the foaming reaction mixture in the creases.

In a further embodiment of the apparatus of the invention, the number of outlet openings on the casting rake is in the range from three to forty. The number of outlet openings is preferably selected here as a function of the swelling behavior of the foaming reaction mixture and the profile width of the covering layer.

The casting rake is preferably arranged in the apparatus at an angle in the range from $\geq 60°$ to $\leq 80°$ to the direction of motion of the covering layer. It has surprisingly been found that the arrangement of the casting rake at such an angle is particularly suitable, even in the case of a complicated geometry of the profile of the covering layer, to ensure formation of a uniform foam layer.

In an embodiment of the apparatus of the invention, the at least one casting rake is aligned essentially parallel to the plane of the covering layer. The central axes of the tubular hollow bodies of the casting rakes arranged at an angle to one another so as to form a V-shape span a plane which extends parallel to the plane formed by the covering layer. In particular, the central axis of the tubular hollow body can have a pointing arrangement in the direction of motion of the casting rake relative to the covering layer or the central axis of the tubular hollow body has a dragging arrangement opposite to the direction of motion of the casting rake relative to the covering layer.

It can be a further advantage for the casting rake to have a feed line for the reaction mixture into the tubular hollow body which opens essentially centrally, based on the length of the tubular hollow body, into the tubular hollow body and which preferably has the same structure as the tubular hollow body. In the case of such a feed line, it is also provided for the casting rake to be closed at the ends, i.e. at the respective ends of its longitudinal extension, so that the reaction mixture fed in cannot exit at the respective ends.

Likewise, it can be provided according to the invention that the casting rake has a feed line for the reaction mixture into the tubular hollow body which opens into the tubular hollow body at the end of the casting rake and feeds the reaction mixture in at the end. Here, it can be advantageous either for the reaction mixture to be introduced into the tubular hollow body at one end of the longitudinal extension of the casting rake, or for the reaction mixture to be fed into the tubular hollow body at both longitudinal ends of the casting rake.

Both in the case of an essentially central arrangement of the feed line and in the case of introduction at one end, a feed tube can be provided as integral constituent of the casting rake. When the casting rake is produced, for example, by means of an injection-molding technique, such a feed tube can advantageously be provided as part of the shape of the casting rake and rake and feed line can be injection-molded together. In this case, a suitable plastic or a suitable metal or a suitable alloy can be used as material for producing the casting rake.

In a further preferred embodiment of the apparatus, the outlet openings are formed by exit tubes, with the length of the exit tubes preferably decreasing with increasing distance from the point at which the reaction mixture is fed from the feed line into the tubular hollow body. In this way, about the same mass flow of reaction mixture exits from each exit tube arranged on the tubular hollow body. It is likewise possible for the casting rake to have a wider flow cross section and the different lengths of the exit tubes to be formed by drill holes of different lengths through the profile of the exit tubes. Likewise, the outlets of differing length can be provided directly during the manufacture of the casting rake, for example by means of injection-molding techniques.

In a further embodiment of the invention, it is provided that the internal diameter of the tubular hollow body decreases with increasing distance from the point at which the reaction mixture is fed in through the feed line. In this way, the uniformity of the exit rate of the foaming reaction mixture can likewise be increased in an advantageous way and the uniformity of the application of the reaction mixture on the covering layer can thus be improved.

In a further embodiment of the apparatus, the apparatus has a mixing head for the foaming reaction mixture, with the mixing head being fluidically connected to the at least one casting rake and, in particular, the mixing head being arranged fluidically upstream of the at least one casting rake. In the mixing head, the individual components of the foaming reaction mixture are mixed immediately before application of the reaction mixture to the covering layer. In this case, the mixing head can have at least two inlets for components of the foaming reaction mixture and an outlet which is fluidically connected to the casting rake. Thus, for example, it can be provided that a suitable polyol component is fed into the mixing head through one inlet and a suitable isocyanate component is fed in through a further inlet and these components are then mixed in the mixing head to form a foamable reaction mixture and the mixture is applied via the casting rake to the covering layer.

The foaming reaction mixture can, for example, contain a compound which is reactive toward polyisocyanates and a polyisocyanate. Suitable compounds which are reactive toward isocyanates are, in particular, polyols, polyamines, polyamino alcohols and polythiophenes.

Examples of polyamines are ethylenediamine, 1,2- and 1,3-diaminopropane, 1,4-diaminobutane, 1,6-diaminohexane, isophoronediamine, an isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4'-diaminodicyclohexylmethane, diethylmethylbenzenediamine (DETDA), 4,4'-diamino-3,3'-dichlorodiphenylmethane (MOCA), dimethylethylenediamine, 1,4-bis(aminomethyl)cyclohexane, 4,4'-diamino-3,3'-dimethyldicyclohexylmethane and 4,4'-diamino-3,5-diethyl-3',5'-diisopropyldicyclohexylmethane. Polymeric polyamines such as polyoxyalkylenamines are also suitable.

Examples of amino alcohols are N-aminoethylethanolamine, ethanolamine, 3-aminopropanol, neopentanolamine and diethanolamine.

Examples of polythiols are di(2-mercaptoethyl) ether, pentaerythrityl tetrakisthioglycolate, pentaerythrityl tetrakis(3-mercaptopropionate) and 1,2-bis((2-mercaptoethyl)thio)-3-mercaptopropane.

Polyol is preferably selected from the group consisting of polyether polyols, polyester polyols, polycarbonate polyols, polyether ester polyols and polyacrylate polyols, with, furthermore, the OH number of the polyol being from ≥100 mg KOH/g to ≤800 mg KOH/g, particularly preferably from ≥350 mg KOH/g to ≤650 mg KOH/g and the average OH functionality of the polyols being ≥2.

Polyols which can be used can, for example, have a number average molecular weight $M_n$ of from ≥60 g/mol to ≤8000 g/mol, preferably from ≥90 g/mol to ≤5000 g/mol and more preferably from ≥92 g/mol to ≤1000 g/mol. In the case of a single added polyol, the OH number indicates the OH number thereof. In the case of mixtures, the average OH number is reported. This value can be determined in accordance with DIN 53240. The average OH functionality of the polyols mentioned is ≥2, for example in a range from ≥2 to ≤6, preferably from ≥2.1 to ≤4 and more preferably from ≥2.2 to ≤3.

Polyether polyols which can be used are, for example, polytetramethylene glycol polyethers which can be obtained by polymerization of tetrahydrofuran by means of cationic ring opening.

Further suitable polyether polyols are addition products of styrene oxide, ethylene oxide, propylene oxide, butylene oxides and/or epichlorohydrin onto bifunctional or polyfunctional starter molecules.

Suitable starter molecules are, for example, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol and also low molecular weight, hydroxyl-containing esters of such polyols with dicarboxylic acids.

Polyester polyols which can be used are, inter alia, polycondensates of diols and also triols and tetrols with dicarboxylic and also tricarboxylic and tetracarboxylic acids or hydroxycarboxylic acids or lactones. The corresponding polycarboxylic anhydrides or corresponding polycarboxylic esters of lower alcohols can also be used instead of the free polycarboxylic acids for preparing the polyesters.

Examples of suitable diols are ethylene glycol, butylene glycol, diethylene glycol, triethylene glycol, polyalkylene glycols such as polyethylene glycol, also 1,2-propanediol, 1,3-propanediol, 1,3-butanediol, 1,4-butanediol, 1,6-hexanediol and isomers, neopentyl glycol and the neopentyl glycol ester of hydroxypivalic acid. It is also possible to use polyols such as trimethylolpropane, glycerol, erythritol, pentaerythritol, trimethylolbenzene or trishydroxyethyl isocyanurate.

As polycarboxylic acids, it is possible to use, for example, phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimeric fatty acid, trimeric fatty acid, citric acid or trimellitic acid. The corresponding anhydrides can also be used as acid source.

If the average functionality of the polyol to be esterified is ≥2, monocarboxylic acids such as benzoic acid and hexanecarboxylic acid can additionally be concomitantly used.

Hydroxycarboxylic acids which can be concomitantly used as reaction participants in the preparation of a polyester polyol having terminal hydroxyl groups are, for example, hydroxycaproic acid, hydroxybutyric acid, hydroxydecanoic acid, hydroxystearic acid and the like. Suitable lactones are, inter alia, caprolactone, butyrolactone and homologues.

Polycarbonate polyols which can be used are hydroxyl-containing polycarbonates, for example polycarbonate diols. These can be obtained by reaction of carbonic acid derivatives such as diphenyl carbonate, dimethyl carbonate or phosgene with polyols, preferably diols.

Examples of such diols are ethylene glycol, 1,2- and 1,3-propanediol, 1,3- and 1,4-butanediol, 1,6-hexanediol, 1,8-octanediol, neopentyl glycol, 1,4-bishydroxymethylcyclohexane, 2-methyl-1,3-propanediol, 2,2,4-trimethyl-1,3-pentanediol, dipropylene glycol, polypropylene glycols, dibutylene glycol, polybutylene glycols, bisphenol A and lactone-modified diols of the abovementioned type.

Polyether-polycarbonate diols can also be used instead of or in addition to pure polycarbonate diols.

Polyether ester polyols which can be used are those compounds which contain ether groups, ester groups and OH groups. Organic dicarboxylic acids having up to 12 carbon atoms are suitable for preparing the polyether ester polyols, preferably aliphatic dicarboxylic acids having from ≥4 to ≤6 carbon atoms or aromatic dicarboxylic acids, which are used individually or in admixture. Examples which may be mentioned are suberic acid, azelaic acid, decanedicarboxylic acid, maleic acid, malonic acid, phthalic acid, pimelic acid and sebacic acid and also, in particular, glutaric acid, fumaric acid, succinic acid, adipic acid, phthalic acid, terephthalic acid and isoterephthalic acid. As derivatives of these acids, it is possible to use, for example, their anhydrides and also their esters and monoesters with low molecular weight, monofunctional alcohols having from ≥1 to ≤4 carbon atoms.

As further component for preparing the polyether ester polyols, it is possible to use polyether polyols which are obtained by alkoxylation of starter molecules such as polyhydric alcohols. The starter molecules are at least bifunctional but can optionally also contain proportions of starter molecules having a higher functionality, in particular tri-functional starter molecules. Polyether ester polyols can be obtained by reaction of polycarboxylic anhydrides with diols and subsequent alkoxylation of the resulting compounds.

Starter molecules are, for example, diols having primary OH groups and number average molecular weights $M_n$ of preferably from ≥18 g/mol to ≤400 g/mol or from ≥62 g/mol to ≤200 g/mol, e.g. 1,2-ethanediol, 1,3-propanediol, 1,4-butanediol, 1,5-pentenediol, 1,5-pentanediol, neopentyl glycol, 1,6-hexanediol, 1,7-heptanediol, 1,8-octanediol, 1,10-decanediol, 2-methyl-1,3-propanediol, 2,2-dimethyl-1,3-propanediol, 3-methyl-1,5-pentanediol, 2-butyl-2-ethyl-1,3-propanediol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, e.g. diethylene glycol.

In addition to the diols, it is also possible to make concomitant use of polyols having number average functionalities of from ≥2 to ≤8, of from ≥3 to ≤4, for example 1,1,1-trimethylolpropane, triethanolamine, glycerol, sorbitan and pentaerythritol and also polyethylene oxide polyols started on triols or tetraols and having average molecular weights of preferably from ≤18 g/mol to ≤400 g/mol or from ≥62 g/mol to ≤200 g/mol. Preference is given to glycerol.

Polyacrylate polyols can be obtained by free-radical polymerization of hydroxyl-containing, olefinically unsaturated monomers or by free-radical copolymerization of hydroxyl-containing, olefinically unsaturated monomers with optionally other olefinically unsaturated monomers. Examples of monomers are ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and methacrylonitrile. Suitable hydroxyl-containing, olefinically unsaturated monomers are, in particular, 2-hydroxyethyl acrylate, 2-hydroxyethyl methacrylate, the hydroxypropyl acrylate isomer mixture obtainable by addition of propylene oxide onto acrylic acid and also the hydroxypropyl methacrylate isomer mixture obtainable by addition of propylene oxide onto methacrylic acid. Terminal hydroxyl groups can also be present in protected form. Suitable free-radical initiators are those from the group of azo compounds, for example azoisobutyronitrile (AIBN), or from the group of peroxides, for example di-tert-butyl peroxide.

Examples of suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof having any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) or higher homologues (polymeric MDI, pMDI), 1,3- and/or 1,4-bis(2-isocyanatoprop-2-yl)benzene (TMXDI), 1,3-bis(isocyanatomethyl)benzene (XDI), and also alkyl 2,6-diisocyanatohexanoates (lysine diisocyanates) having $C_1$-$C_6$-alkyl groups. Particular preference is given to a mixture of MDI and pMDI.

In addition to the abovementioned polyisocyanates, it is also possible to concomitantly use proportions of modified diisocyanates having uretdione, isocyanurate, urethane, carbodiimide, uretonimine, allophanate, biuret, amide, iminooxadiazinedione and/or oxadiazinetrione structures and also unmodified polyisocyanate having more than 2 NCO groups per molecule, for example 4-isocyanatomethyloctane 1,8-diisocyanate (nonane triisocyanate) or triphenylmethane 4,4',4''-triisocyanate.

It is possible for the number of NCO groups in the isocyanate and the number of the groups which are reactive toward isocyanates to be present in the reaction mixture in a number ratio of from ≥70:100 to ≤500:100. This parameter can also be in a range from ≥180:100 to ≤330:100 or else from ≥90:100 to ≤140:100.

The foaming reaction mixture can, for example, also comprise acrylamide, epoxides and/or phenol, melamine and/or urea-formaldehyde. Polyacrylamide, epoxy foams, phenolic resin foams, melamine resin foams or urea foams can be obtained in this way.

In a further embodiment of the apparatus of the invention, the exit tubes of the casting rake are aligned at an angle of ≥5° and preferably of ≥5° and ≤30° to an axis orthogonal to the plane of the covering layer. In this way, the velocity at which the foaming reaction mixture impinges on the covering layer present under the casting rake is reduced, as a result of which more uniform application of the mixture to the covering layer can advantageously be achieved. In a further embodiment, it can be provided that the outlet tubes are aligned in the direction opposite to the direction of motion of the movably arranged covering layer. In this way, the width of the impingement zone of the foaming reaction mixture can be increased, so that the strands of foaming reaction mixture flow together more quickly.

In addition, the invention also provides a process for producing a composite element, in which a foaming reaction mixture is applied by means of an apparatus of the above-described type to a moving covering layer.

PREFERRED EXAMPLES OF THE INVENTION

The invention is illustrated below with the aid of figures, in which.

Figure 6:
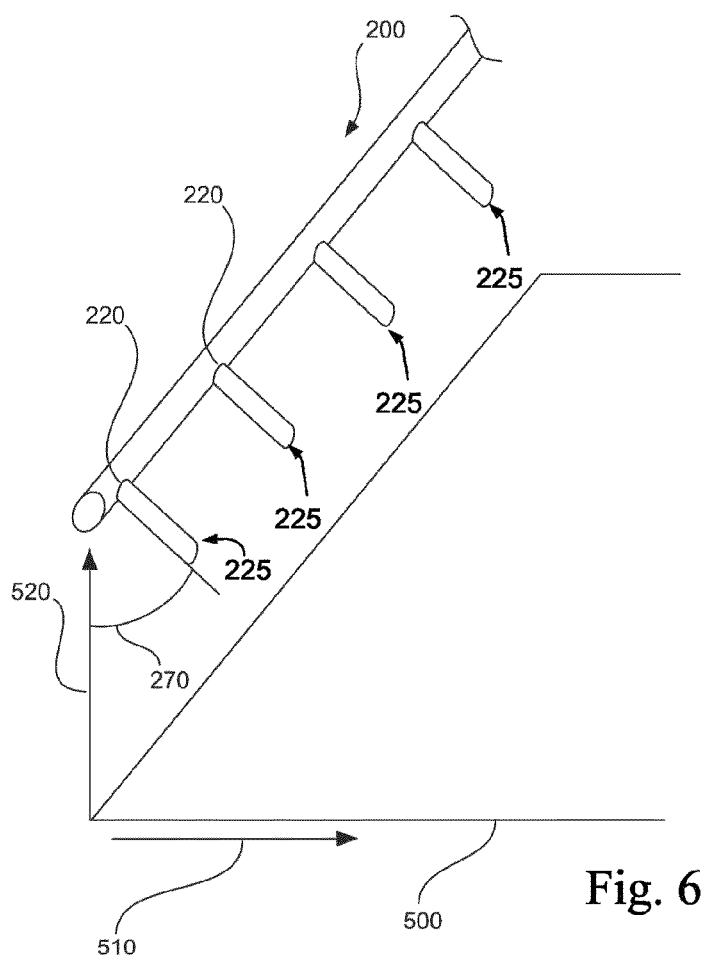

FIG. 6 schematically shows the exit tubes arranged at an exit angle.

Figure 1:
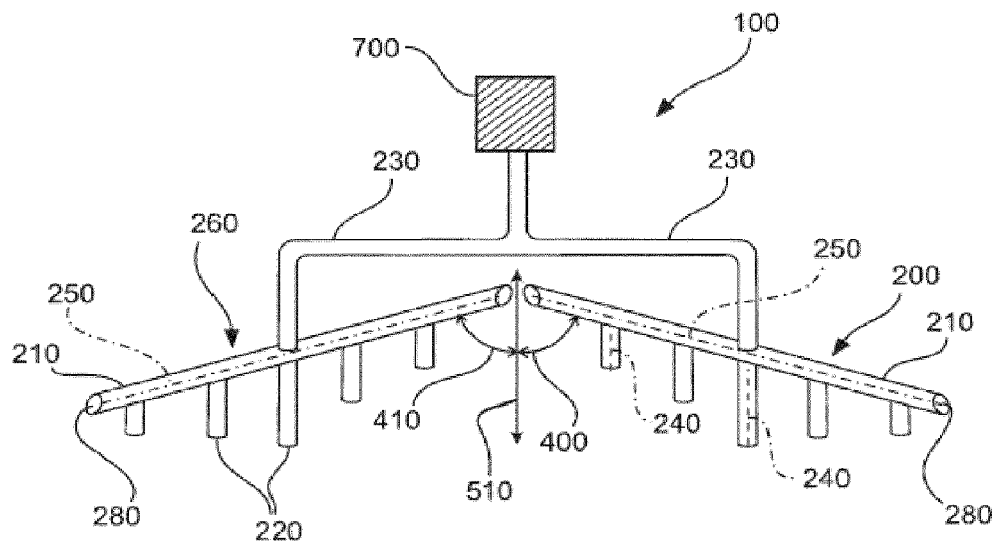
FIGS. 1 and 1a show a schematic view of an apparatus according to the invention for producing a composite element.
Figure 1A:
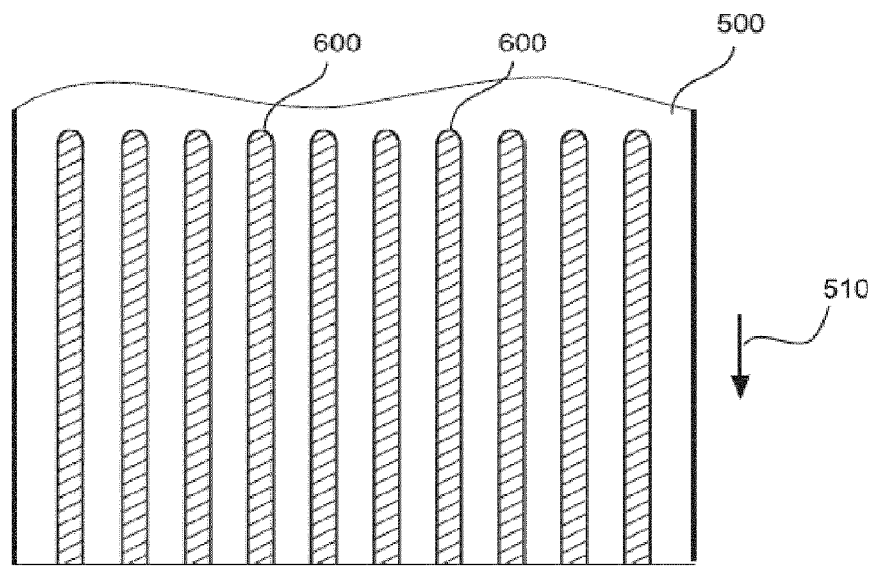

FIGS. 1 and 1a show an apparatus 100 for applying a foaming reaction mixture 600 to a movably arranged covering layer 500. The apparatus 100 comprises, in the embodiment shown, two casting rakes 200, 260 each having a tubular hollow body 210. The tubular hollow body 210 has a plurality of outlet openings 220 in the form of exit tubes 225 from which the foaming reaction mixture 600 is discharged and the outlet opening 220 is located at the free end of the exit tube 225. According to the invention the casting rakes 200, 260 are arranged at angles 400, 410 having an equal absolute value of ≤80° to the direction of motion 510 of the covering layer 500. The casting rakes 200, 260 each have a feed line 230 for the foaming reaction mixture 600 in the tubular hollow bodies 210. The feed line 230 is arranged essentially centrally along the length of the casting rakes 200, 260. The length 240 of the exit tubes 225 decreases from the feed line 230 in the direction of the end 280 of the casting rakes 200, 260. The foaming reaction mixture 600 is fed to the casting rakes 200, 260 from a mixing head 700 via the feed lines 230 and exits through the outlet openings 220 from where it impinges on the covering layer 500 and there swells and cures to form a foam.

Figure 2:
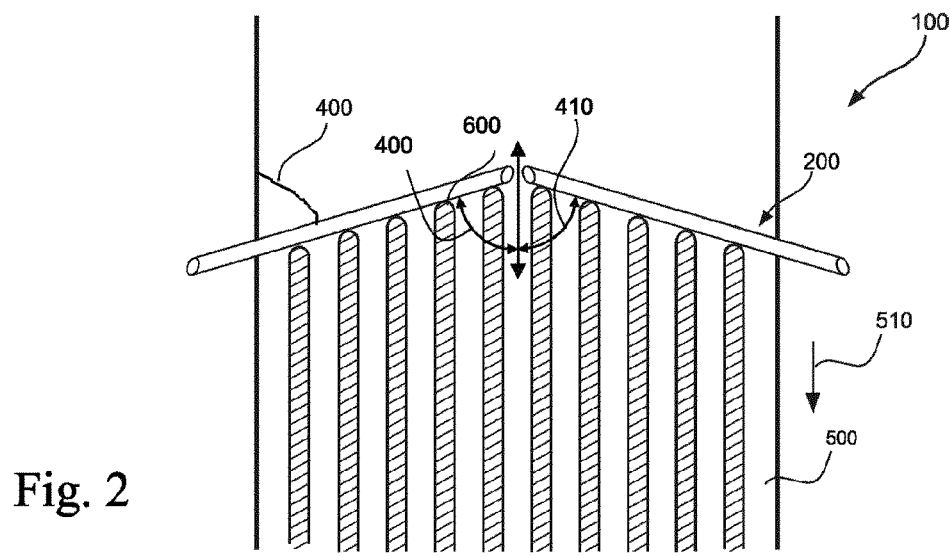
FIG. 2 shows a top view of an apparatus according to the invention.

FIG. 2 shows a plan view of an apparatus 100 according to the invention, where the casting rakes 200, 260 are aligned at an angle 400 of ≤80° to the direction of motion 510 of the covering layer 500. From the casting rakes 200, 260, the foaming reaction mixture 600 flows onto the covering layer 500.

Figure 3:
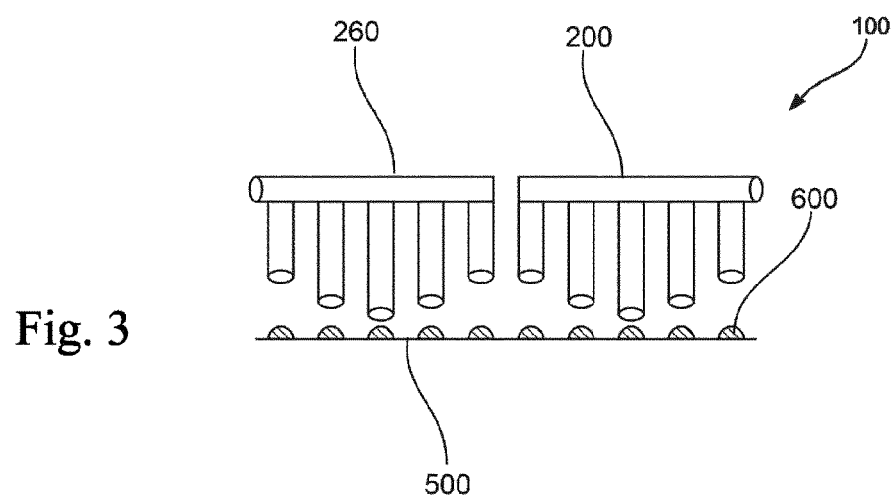
FIG. 3 shows a front view of an apparatus according to the invention.

FIG. 3 shows a front view of an apparatus 100 according to the invention in which the two casting rakes 200, 260 by means of which the foaming reaction mixture 600 can be applied to the covering layer 500 can be seen.

Figure 4:
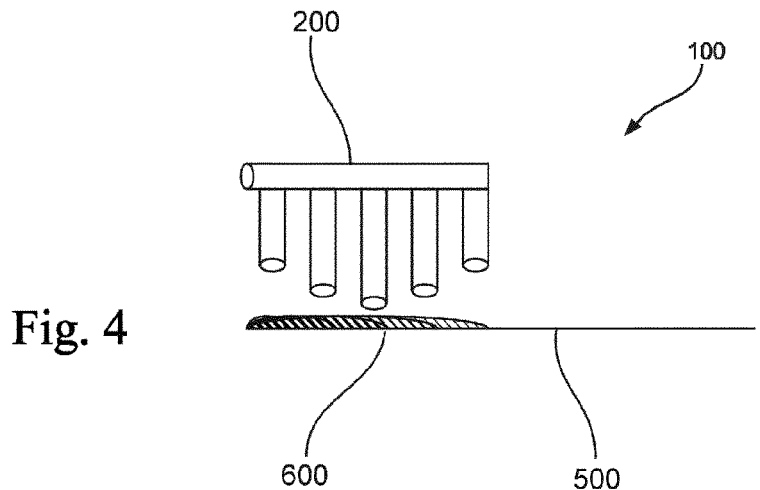
FIG. 4 shows a side view of an apparatus according to the invention.

FIG. 4 shows a side view of an apparatus 100 according to the invention, in which, owing to the perspective, only one casting rake 200 from which the foaming reaction mixture 600 can be applied to the covering layer 500 can be seen.

Figure 5:
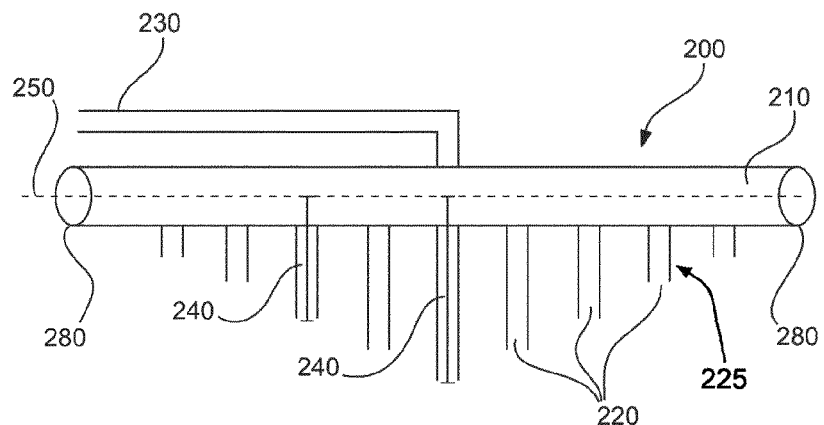
FIG. 5 shows a schematic detailed view of a casting rake that can be used in an apparatus according to the invention.

FIG. 5 shows a schematic detailed view of a casting rake 200 which can be used in an apparatus according to the invention. The casting rake 200 has a feed line 230 for the foaming reaction mixture into the tubular hollow body 210. The feed line 230 is arranged essentially centrally on the casting rake 200. The distance 240 between the central axis 250 of the tubular hollow body 210 and the outlet openings 220 in the form of exit tubes 225 decreases from the feed line 230 in the direction of the end 280 of the casting rake 200. The foaming reaction mixture 600 is fed into the casting rake 200 via the feed lines 230 and exits via the outlet openings 220 from where it goes onto the covering layer 500 and swells and cures there to form a foam. As a result of the different length 240 of the outlet opening 220 as a function of the distance of the respective outlet opening 220 from the feed line 230, uniform and simultaneous impingement of the reaction mixture 600 on the covering layer 500 is achieved.

FIG. 6 schematically shows an embodiment of the invention in which outlet openings 220 arranged at an exit angle 270 are likewise shown in the form of exit tubes 225. The exit tubes 225 are arranged here at an angle 270 to the axis 520 orthogonal to the plane of the covering layer 500. The inclination is effected in such a way that the exit tubes 225 are directed in the direction of movement 510 of the movably arranged covering layer 500. This reduces the impingement velocity of the reaction mixture on the covering layer 500, as a result of which more uniform swelling of the foaming reaction mixture can be achieved. The exit tubes 225 can also be arranged against the direction of motion 510 of the moving covering layer 500. This increases the width of the impingement zone of the foaming reaction mixture 600, so that the strands of the foaming reaction mixture 600 flow together more quickly.

The above-described embodiments can be combined with one another in any desired manner.

LIST OF REFERENCE NUMERALS

100 Apparatus
200 Casting rake
210 Tubular hollow body
220 Outlet opening
225 Exit tube
230 Feed line
240 Length of outlet
250 Central axis of tubular hollow body
260 Second casting rake
270 Exit angle
280 End of the casting rake
400 Angle
410 Angle
500 Covering layer
510 Longitudinal axis, direction of motion
520 Orthogonal axis
600 Foaming reaction mixture
700 Mixing head

The invention claimed is:

1. A process for producing a composite element, comprising applying a foaming reaction mixture, wherein the foaming reaction mixture is applied by means of an apparatus to a moving covering layer, wherein the apparatus comprises:
    at least one casting rake having a tubular hollow body which extends along a central axis and has at least two outlet openings for exit of the foaming reaction mixture;
    wherein the casting rake and the covering layer move relative to one another along a longitudinal axis parallel to the direction of motion of the covering layer; and
    wherein the at least one casting rake is positioned transverse to the longitudinal axis such that the central axis of the at least one casting rake and the longitudinal axis form an angle of ≥60° to ≤80°.

2. The process as claimed in claim 1, wherein the covering layer comprises a metal, a plastic, a glass fiber-containing material, a mineral fiber-containing material and/or a cellulose-containing material and/or the foaming reaction mixture has an isocyanate-reactive component and an isocyanate component.

3. The process as claimed in claim 1, wherein
    the central axis of the at least one casting rake is aligned parallel to the plane of the covering layer and/or
    the central axis of the tubular hollow body has a pointing arrangement at the angle to the direction of motion of the casting rake relative to the covering layer or
    the central axis of the tubular hollow body has a dragging arrangement at the angle opposite to the direction of motion of the casting rake relative to the covering layer.

4. The process as claimed in claim 1, wherein at least two casting rakes having respective central axes are provided, which central axes are arranged at angles having identical absolute values relative to the longitudinal axis of the motion between the casting rakes and the covering layer.

5. The process as claimed in claim 1, wherein the number of outlet openings of the casting rake is in the range from three to forty.

6. The process as claimed in claim 1, wherein the casting rake has a feed line for the reaction mixture into the tubular hollow body, which feed line opens essentially centrally, based on the length of the tubular hollow body into the tubular hollow body.

7. The process as claimed in claim 1, wherein the casting rake has a feed line for the reaction mixture into the tubular hollow body, which feed line opens into the tubular hollow body at the end of the casting rake and feeds the reaction mixture in at the end.

8. The process as claimed in claim 6, wherein the outlet openings are formed by exit tubes and, the length of the exit tubes decreases with increasing distance from the point at which the reaction mixture is fed in via the feed line.

9. The process as claimed in claim 6, wherein the internal diameter of the tubular hollow body decreases with increasing distance from the point at which the reaction mixture is fed in via the feed line.

10. The process as claimed in claim 1, wherein a mixing head for the foaming reaction mixture is provided and the mixing head is fluidically connected to the at least one casting rake and, the mixing head is arranged fluidically upstream of the at least one casting rake.

11. The process as claimed in claim 7, wherein the exit tubes of the casting rake are aligned at an angle of $\geq 5°$ to an axis orthogonal to the plane of the covering layer.

* * * * *